(12) United States Patent
Roh et al.

(10) Patent No.: US 12,437,689 B2
(45) Date of Patent: Oct. 7, 2025

(54) FLEXIBLE DISPLAY DEVICE

(71) Applicant: LG DISPLAY CO., LTD., Seoul (KR)

(72) Inventors: Eun Roh, Seoul (KR); Nohjin Myung, Paju-si (KR); Jieun Lee, Busan (KR)

(73) Assignee: LG DISPLAY CO., LTD., Seoul (KR)

(*) Notice: Subject to any disclaimer, the term of this patent is extended or adjusted under 35 U.S.C. 154(b) by 410 days.

(21) Appl. No.: 17/534,143

(22) Filed: Nov. 23, 2021

(65) Prior Publication Data
US 2022/0189349 A1    Jun. 16, 2022

(30) Foreign Application Priority Data
Dec. 15, 2020  (KR) .......................... 10-2020-0175076

(51) Int. Cl.
*G09G 3/00* (2006.01)
*B32B 3/30* (2006.01)
(Continued)

(52) U.S. Cl.
CPC .............. *G09G 3/035* (2020.08); *B32B 3/30* (2013.01); *B32B 7/12* (2013.01); *B32B 15/08* (2013.01);
(Continued)

(58) Field of Classification Search
CPC .. G09G 3/035; B32B 3/30; B32B 7/12; B32B 15/08; B32B 2262/103; B32B 2307/202;
(Continued)

(56) References Cited

U.S. PATENT DOCUMENTS 10,429,895 B2 * 10/2019 Lee .................. G06F 1/1643
10,691,175 B2 *  6/2020 Lee .................. G06F 1/1641
(Continued)

FOREIGN PATENT DOCUMENTS

CN   109659318 A   4/2019
CN   109727538 A   5/2019
(Continued)

OTHER PUBLICATIONS

Office Action issued in corresponding Chinese application 202111394773.9 dated Nov. 24, 2023 with machine translation.
(Continued)

*Primary Examiner* — Nathan L Van Sell
(74) *Attorney, Agent, or Firm* — Morgan, Lewis & Bockius LLP (57) ABSTRACT

A flexible display device includes: a display panel including a folding area and a non-folding area; and a back plate which includes a base layer which supports the display panel, below the display panel and includes a plurality of grooves on a bottom surface corresponding to the folding area and a filler which is filled in at least a part of the plurality of grooves, and the filler includes a metal fiber. According to the exemplary embodiment of the present disclosure, components such as a plate top, a plate bottom, and a damping layer are not included, but a mechanical property such as impact resistance is satisfied and the thickness of the display device is minimized so that the folding characteristic and the reliability are significantly improved. Therefore, a flexible display device having a larger curvature than that of the related art may be easily implemented.

13 Claims, 10 Drawing Sheets

(51) Int. Cl.
  *B32B 7/12* (2006.01)
  *B32B 15/08* (2006.01)
  *G02B 1/11* (2015.01)
  *G02B 1/14* (2015.01)

(52) U.S. Cl.
  CPC .......... *G02B 1/14* (2015.01); *B32B 2262/103* (2013.01); *B32B 2307/202* (2013.01); *G02B 1/11* (2013.01)

(58) Field of Classification Search
  CPC .......... G02B 1/14; G02B 1/11; G06F 1/1652; G09F 9/301; D01F 11/127; H10K 50/84; H10K 2102/311
  See application file for complete search history.

(56) References Cited

U.S. PATENT DOCUMENTS

| | | | | |
|---|---|---|---|---|
| 2015/0216057 | A1* | 7/2015 | Park | H05K 3/207 174/255 |
| 2016/0327977 | A1* | 11/2016 | Tang | H01L 21/565 |
| 2018/0150108 | A1 | 5/2018 | Song | |
| 2019/0204867 | A1 | 7/2019 | Song et al. | |
| 2019/0204872 | A1* | 7/2019 | Lee | G06F 1/1641 |
| 2019/0213924 | A1 | 7/2019 | Ha et al. | |
| 2019/0384363 | A1* | 12/2019 | Lee | G06F 1/1652 |
| 2020/0166970 | A1 | 5/2020 | Yeom | |
| 2020/0235139 | A1 | 7/2020 | Ke | |
| 2020/0245477 | A1 | 7/2020 | Park et al. | |
| 2021/0217975 | A1 | 7/2021 | Gu et al. | |
| 2023/0091649 | A1 | 3/2023 | Li | |

FOREIGN PATENT DOCUMENTS

| | | |
|---|---|---|
| CN | 109903679 A | 6/2019 |
| CN | 110021236 A | 7/2019 |
| CN | 110707125 A | 1/2020 |
| CN | 111028682 A | 4/2020 |
| CN | 112053635 A | 12/2020 |
| KR | 10-2016-0069503 A | 6/2016 |
| KR | 10-2018-0062272 A | 6/2018 |
| KR | 10-2019-0081341 B1 | 7/2019 |
| KR | 10-2019-0082339 A | 7/2019 |
| KR | 10-2020-0063801 A | 6/2020 |

OTHER PUBLICATIONS

Search Report issued in corresponding Chinese application 202111394773.9 dated Nov. 21, 2023.
KR Office Action issued in application 10-2020-0175076 dated Sep. 9, 2024 (with machine translation).
CN Office Action issued in application 202111394773.9 dated Sep. 23, 2024 (with machine translation).

* cited by examiner

FLEXIBLE DISPLAY DEVICE

CROSS-REFERENCE TO RELATED APPLICATIONS

This application claims the priority of Korean Patent Application No. 10-2020-0175076 filed on Dec. 15, 2020, in the Korean Intellectual Property Office, the disclosure of which is incorporated herein by reference.

BACKGROUND

Technical Field

The present disclosure relates to a flexible display device, and more particularly, to a flexible display device which has an excellent mechanical property, an improved appearance quality, and an improved folding reliability.

Discussion of the Related Art

Recently, as it enters an information era, a display field which visually expresses electrical information signals has been rapidly developed and in response to this, various display devices having excellent performances such as thin-thickness, light weight, and low power consumption have been developed. Specific examples of such a display device include a liquid crystal display (LCD) device, a plasma display panel (PDP) device, a field emission display (FED) device, an organic light emitting display (OLED) device, and the like.

In the meantime, efforts are being continued to diversify a shape and a size of the display device. For example, display devices having various shapes, such as a curved display device having a curved surface or a flexible display device which maintains its display performance even in a bent or curved state, are consistently being developed. A display panel of the flexible display device uses a flexible substrate so that a support member such as a back plate is disposed below the display panel to suppress the sagging of the display panel and protect the display panel from foreign materials and impact from the outside.

SUMMARY

A support member of the related art is configured by a back plate and a plate assembly including a plate top and a plate bottom and an adhesive layer for bonding the respective layers is disposed. By doing this, the thickness of the support member is thick so that a stress applied to the support member is significant during the folding, which degrades the folding reliability.

Further, in order to implement a desired curvature, an opening pattern is formed in at least a partial area of the back plate and/or the plate assembly. However, there is a problem in that the opening pattern is visible to a user, which deteriorates an appearance quality. Further, even though a damping layer with a foam structure is disposed at a lowermost portion to ensure the impact resistance, defects are caused due to the dent or puncture of a surface during the folding.

Accordingly, embodiments of the present disclosure are directed to a flexible display device that substantially obviates one or more of the problems due to limitations and disadvantages of the related art.

An aspect of the present disclosure is to provide a flexible display device including a back plate which significantly reduces the thickness of the display device while maintaining a rigidity to be high.

Another aspect of the present disclosure is to provide a flexible display device which has an excellent folding reliability and impact resistance and an excellent appearance quality with a higher curvature as compared with the related art.

Still another aspect of the present disclosure is to provide a flexible display device which reduces the visibility of the pattern formed in the folding area and disperses a stress concentrated on an engraved pattern portion during the folding to suppress the rupture or plastic deformation during the repeated folding.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a flexible display device comprises: a display panel including a folding area and a non-folding area; and a back plate which includes a base layer which supports the display panel, below the display panel and includes a plurality of grooves on a bottom surface corresponding to the folding area and a filler which is filled in at least a part of the plurality of grooves, and the filler includes a metal fiber.

Other detailed matters of the exemplary embodiments are included in the detailed description and the drawings.

According to the exemplary embodiment of the present disclosure, the flexible display device forms a groove pattern in the back plate, rather than the opening pattern, to effectively relieve the folding stress and reduce the visibility of the pattern, thereby improving an appearance quality.

Further, according to the present disclosure, the metal fiber is filled in the plurality of grooves to disperse the stress which is concentrated on an engraved pattern unit during the folding and improve the rigidity of the back plate. Further, the plurality of grooves is filled with the metal fiber so that the folding stress is effectively relieved and deformation such as a rupture or a plastic deformation is not caused even during the repeated folding to provide a high reliability.

Further, according to the present disclosure, components, such as a plate top, a plate bottom, and a damping layer, which are configured together with the back plate in the related art are omitted so that the thickness of the display device may be significantly reduced. Therefore, it is possible to implement a flexible display device which satisfies a folding reliability and satisfies a mechanical property such as impact resistance and has a larger curvature as compared with the related art. Further, the damping layer is omitted so that the defect problem caused by the dent or puncture of the surface during the folding may be minimized.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a flexible display device according to exemplary embodiments of the present disclosure will be described in detail with reference to accompanying drawings.

Figure 1:
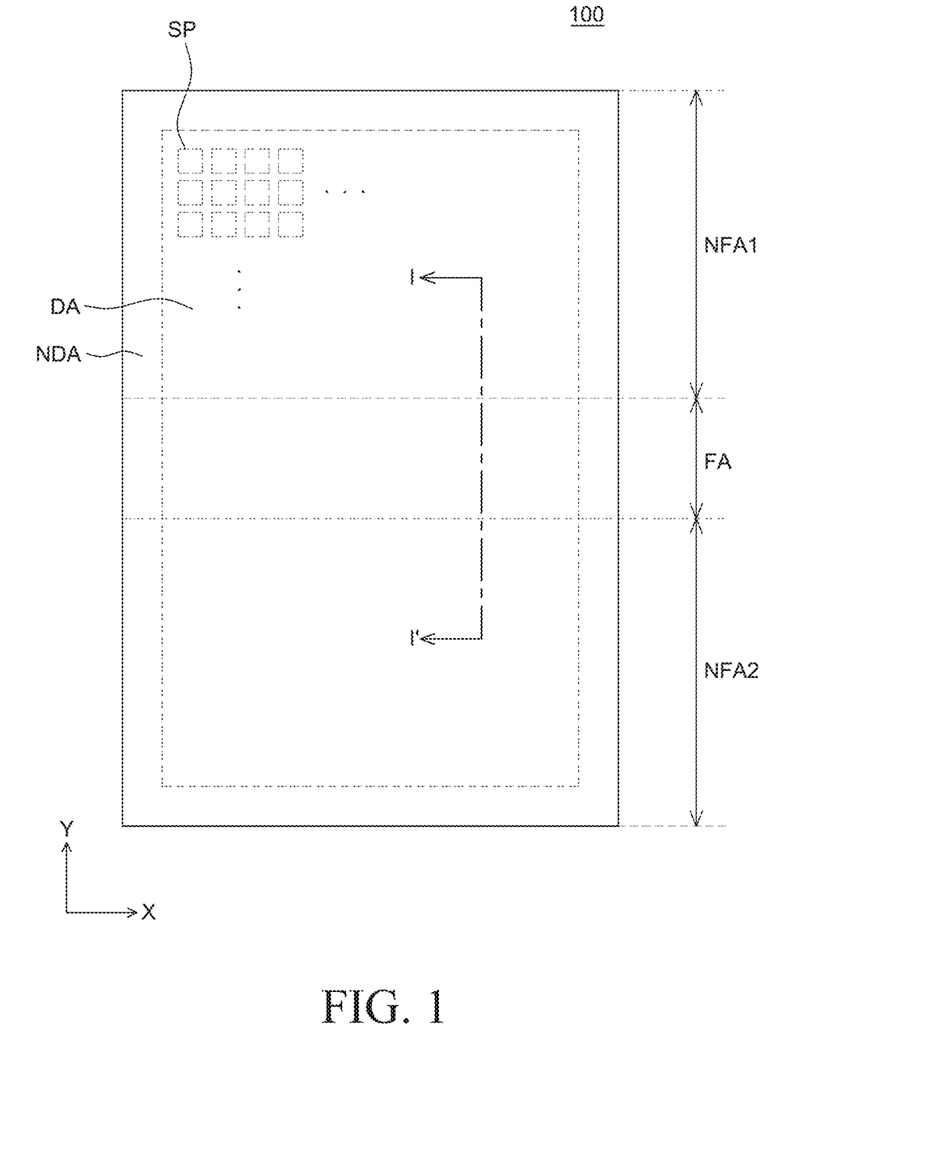
FIG. 1 is a schematic plan view of a flexible display device according to an exemplary embodiment of the present disclosure.
Figure 2:
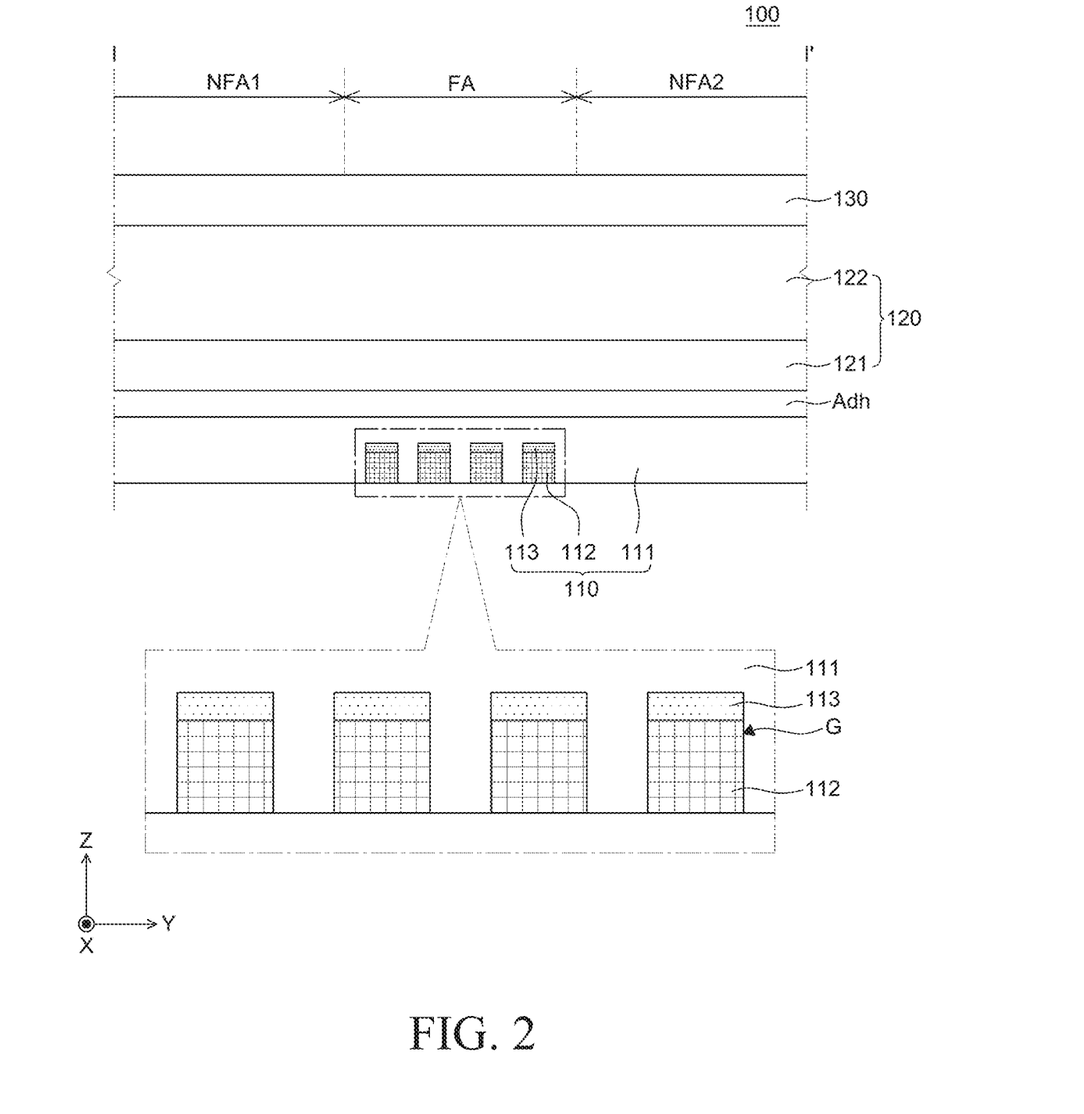
FIG. 2 is a schematic cross-sectional view taken along the line I-I' of FIG. 1.

FIG. 1 is a schematic plan view of a flexible display device according to an exemplary embodiment of the present disclosure. FIG. 2 is a schematic cross-sectional view taken along the line I-I' of FIG. 1.

Referring to FIGS. 1 and 2, the flexible display device 100 according to the exemplary embodiment of the present disclosure includes a back plate 110, a display panel 120, and a cover member 130. Hereinafter, for the convenience of description, the description will be made by assuming that the flexible display device according to the exemplary embodiment of the present disclosure is an organic light emitting display device, but it is not limited thereto.

The display panel 120 includes a display area DA and a non-display area NDA. Further, the display panel 110 includes a folding area FA and non-folding areas NFA1 and NFA2. The display panel 120 may be divided into a display area DA and the non-display area NDA depending on whether to display images and may be divided into a folding area FA and a non-folding area NFA depending on whether to be foldable. Therefore, a partial area of the display panel 120 may be a display area DA and a folding area FA and the other partial area of the display panel 120 may be a non-display area NDA and the non-folding area NFA.

The display area DA is an area where a plurality of pixels is disposed to substantially display images. In the display area DA, a plurality of pixels which includes an emission area to display images, a thin film transistor for driving the pixels, a capacitor, and the like may be disposed. One pixel may include a plurality of sub pixels SP. The sub pixel SP is a minimum unit which configures the display area and each sub pixel SP may be configured to emit light of a specific wavelength band. For example, each of the sub pixels SP may be configured to emit red light, green light, blue light, or white light.

The non-display area NDA is disposed so as to enclose the display area DA. The non-display area NDA is an area where images are not substantially displayed and various wiring lines, driving ICs, and the like for driving the pixels and the driving elements disposed in the display area DA are disposed.

As described above, the display panel 120 may be defined as a folding area FA and non-folding areas NFA1 and NFA2 depending on whether to be foldable. The display panel 120 includes one folding area FA which is foldable and non-folding areas NFA1 and NFA2 excluding the folding area. The folding area FA is an area which is folded when the flexible display device 100 is folded and may be folded in accordance with a specific radius of curvature with respect to a folding axis. For example, the folding axis of the folding area FA may be formed in an X-axis direction and the non-folding areas NFA1 and NFA2 may extend from the folding area FA in a Y-axis direction which is perpendicular to the folding axis. When the folding area FA is folded with respect to the folding axis, the folding area FA may form a part of a circle or an oval. At this time, a radius of curvature of the folding area FA may refer to a radius of a circle or an oval formed by the folding area FA.

The non-folding areas NFA1 and NFA2 are areas which are not folded when the flexible display device 100 is folded. That is, the non-folding areas NFA1 and NFA2 maintain a flat state when the flexible display device 100 is folded. The non-folding areas NFA1 and NFA2 may be located on both sides of the folding area FA. That is, the non-folding areas NFA1 and NFA2 may be areas extending to the Y-axis direction with respect to the folding axis. At this time, the folding area FA may be defined between the non-folding areas NFA1 and NFA2. Further, when the flexible display device 100 is folded with respect to the folding axis, the non-folding areas NFA1 and NFA2 may overlap each other.

The display panel 120 includes a flexible substrate 121 and a display element 122.

The flexible substrate 121 supports various elements which configure the display panel 120. The flexible substrate 121 may be a plastic substrate having a flexibility. For example, the plastic substrate may be a polymer material selected from polyimide, polyamide imide, polyethersulfone, polyethylene terephthalate, and polycarbonate, but is not limited thereto.

The plastic substrate has a relatively weak barrier characteristic against moisture or oxygen so that in order to compensate therefor, the plastic substrate may have a structure in which a plastic film and an inorganic layer are laminated. For example, the flexible substrate 121 may have a multi-layered structure in which a first plastic film, an inorganic layer, and a second plastic film are sequentially laminated, but is not limited thereto.

The flexible substrate 121 has an excellent folding characteristic, but has a thin thickness and has a rigidity lower than that of a glass substrate or a metal substrate so that it is difficult to maintain a constant shape during the folding and thus, a sagging phenomenon may occur. Therefore, in order to support the flexible substrate 121 and improve the impact resistance, a back plate 110 is disposed below the display panel 120.

The back plate 110 is disposed below the display panel 120 to support the display panel 120 and protect the display panel 120 from moisture or foreign materials permeating from the outside and external impacts. The back plate 110 will be described in more detail below.

A driving thin film transistor for driving the display element 122 may be disposed on the flexible substrate 121. The driving thin film transistor may be disposed in each of the plurality of pixel areas. For example, the driving thin film transistor includes a gate electrode, an active layer, a source electrode, and a drain electrode. The driving thin film transistor may further include a gate insulating layer which insulates the gate electrode from the active layer and an interlayer insulating layer which insulates the gate electrode from the source electrode and the drain electrode.

A planarization layer may be disposed on the driving thin film transistor to planarize an upper surface.

The display element 122 may be disposed on the planarization layer. The display element 122 may be an organic light emitting diode. The organic light emitting diode may include an anode, a cathode, and an organic light emitting layer disposed therebetween. In the organic light emitting diode, holes injected from the anode and electrons injected from the cathode are coupled on the organic light emitting layer to emit light. The image may be displayed using the light emitted as described above.

The cover member 130 is disposed on the display element 122. The cover member 130 protects the display panel 120 from the external impact and scratches. Therefore, the cover member 130 may be formed of a material which is transparent and has excellent impact resistance and scratch resistance. Further, the cover member 130 protects the display panel 120 from the moisture permeating from the outside. When the moisture permeates from the outside, the display panel 120 deteriorates so that the display quality may be degraded.

For example, the cover member 130 may be a film formed of a polymer, such as polyimide, polyamide imide, polyethylene terephthalate, polymethyl methacrylate, polypropylene glycol, and polycarbonate. As another example, the cover member may be a film formed of a photoisotropic polymer such as cycloolefin (co)polymer, photoisotropic polycarbonate, or photoisotropic polymethyl methacrylate.

Further, the cover member 130 may have a multi-layered structure in which various functional layers are laminated. For example, the cover member 130 may include various functional layers such as an external light reflection reducing layer, a UV blocking layer, or a hard coating layer.

Figure 3:
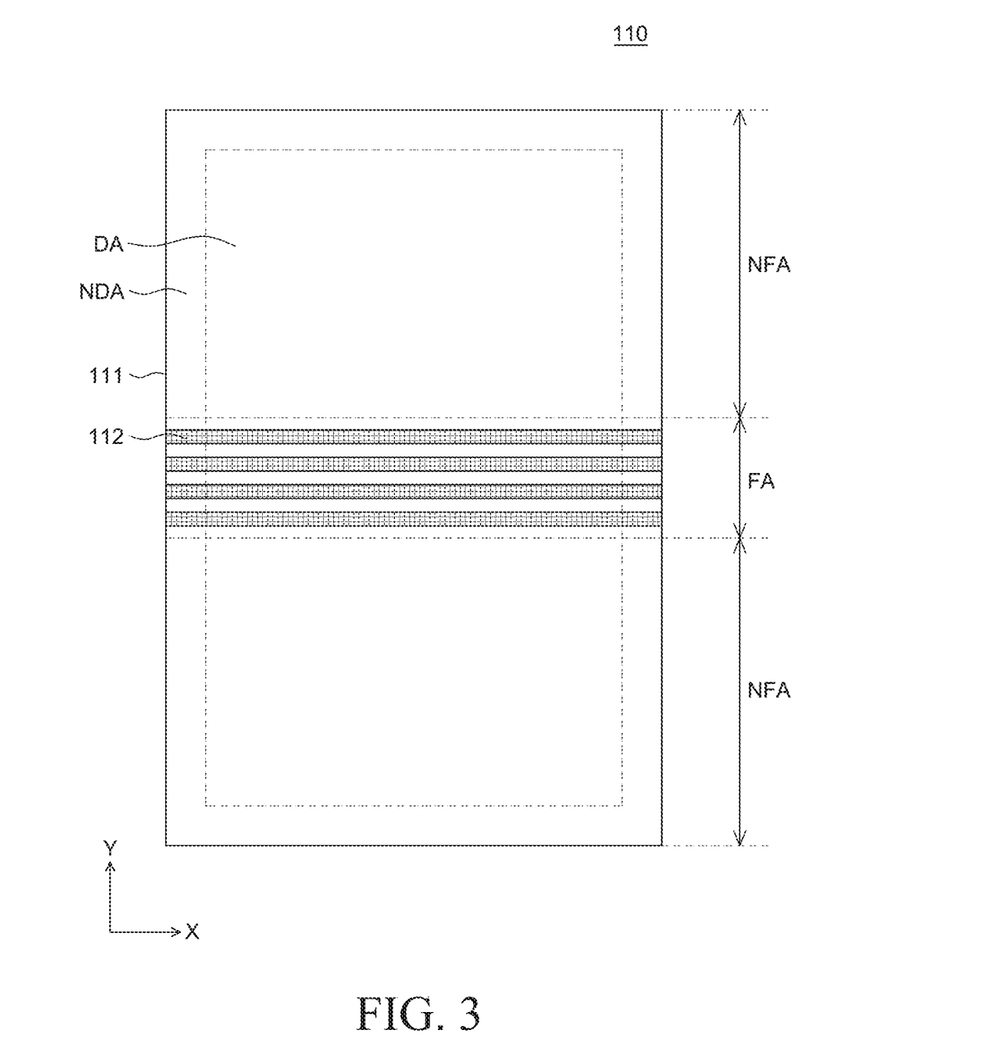
FIG. 3 is a schematic plan view of a bottom surface of a back plate in a flexible display device according to an exemplary embodiment of the present disclosure.

Hereinafter, the back plate 110 will be described in more detail with reference to FIG. 3 together. FIG. 3 is a schematic plan view of a bottom surface of a back plate in a flexible display device according to an exemplary embodiment of the present disclosure.

Referring to FIGS. 2 and 3 together, the back plate 110 is disposed below the display panel 120. That is, the back plate 110 is disposed on a rear surface of the flexible substrate 121 to suppress the sagging or deformation of the flexible substrate 121 and protect the display panel 120 from the external impact or foreign materials.

The back plate 110 may be bonded to the display panel 120 by means of an adhesive layer Adh. That is, the back plate 110 is attached to the rear surface of the flexible substrate 121 by the adhesive layer Adh.

The back plate 110 includes a base layer 111, a filler 112, and a conductive adhesive layer 113.

The base layer 111 serves to substantially support the display panel 120. The base layer 111 may be a plate which is foldable and has an excellent rigidity. The base layer 111 may be formed with a material having a rigidity larger than that of the flexible substrate 121 to support the display panel 120.

For example, the base layer 111 may be a metal plate including a metal such as stainless steel (SUS), invar, aluminum or magnesium. The metal plate has excellent rigidity and impact resistance and an excellent restoring force. When the back plate 110 is formed of a metal material having an excellent rigidity as described above, even though the thickness thereof is reduced, the mechanical property such as a required rigidity may be maintained to firmly support the display panel 120. Therefore, the thickness may be significantly reduced as compared with the back plate formed of a polymer material of the related art. The thickness of the back plate 110 is minimized to reduce the stress which is applied to the back plate 110 or the display panel 120 during the folding and thus the folding reliability may be improved and the folding characteristic may be improved. Further, a flexible display device having a larger curvature as compared with the related art may be implemented and further, a multi-foldable display device or a rollable display device may also be implemented. Further, the base layer 111 formed of the metal material as described above has an excellent restoring force so that even during the repeated folding, the deformation such as plastic deformation is not caused so that the appearance defect may be improved.

For example, a thickness of the base layer 111 may be 90 μm to 220 μm. When the thickness of the base layer 111 is smaller than 90 μm, the base layer is too thin so that the base layer may not effectively support the display panel 120 to be sagged. Further, when the thickness of the base layer 111 is larger than 220 μm, the thickness of the back plate 110 is large so that when the flexible display device 100 is folded, a stress applied to the display panel 120 is increased, which may cause the crack. Further, the restoring force is reduced to cause the plastic deformation, which may not satisfy the folding reliability.

The base layer 111 includes a plurality of grooves G. Even though in FIGS. 2 and 3, for the convenience of description, it is illustrated that four grooves are formed, it is not limited thereto.

The plurality of grooves G may be formed on a bottom surface of the base layer 111 so as to correspond to the folding area FA. That is, the plurality of grooves G is recessed toward the top surface from the bottom surface of the base layer 111. When the flexible display device 100 is folded, the stress is concentrated on the folding area FA. The plurality of grooves G may disperse the stress concentrated on the folding area FA during the folding. As described above, as the plurality of grooves G is formed in a position corresponding to the folding area FA, it is advantageous in that the flexible display device 100 is easily folded and the restoring force is excellent.

Referring to FIG. 3, each of the plurality of grooves G may be formed to extend along a direction parallel to the folding axis to be long. That is, each of the plurality of grooves G may be formed to extend to be long along the X-axis direction which is the same as the folding axis. Accordingly, each of the plurality of grooves G may be formed to be parallel to the folding axis with a bar shape in plan view.

Each of the plurality of grooves G may continuously extend to the non-display area across the display area DA without being disconnected, along the X-axis direction which is the same as the folding axis, but is not limited thereto.

Even though in FIGS. 2 and 3, it is illustrated that a cross-sectional shape of each of the plurality of grooves G is a quadrangular shape, it is not limited thereto. The cross-sectional shape of each of the plurality of grooves G may be formed with various shapes such as a polygonal shape other than a semi-circular shape or a quadrangular shape.

In the related art, in order to disperse the folding stress concentrated on the folding area, opening patterns, that is, a plurality of holes is formed on the base layer. In this case, the folding stress is dispersed to satisfy the folding reliability, but the visibility of the opening pattern is increased so that the appearance quality deteriorates.

The flexible display device 100 according to the exemplary embodiment of the present disclosure forms grooves on the bottom surface of the base layer 111 so that the visibility of the pattern is reduced to improve the appearance quality. That is, the plurality of grooves G is formed with a predetermined depth from the bottom surface of the base layer 111 to a thickness direction (a Z-axis) of the base layer 111. Therefore, the plurality of grooves G formed in the folding area FA is not visible to the user so that the appearance quality may be improved.

For example, a depth of each of the plurality of grooves G may be 10 μm to 40 μm or 20 μm to 30 μm and within this range, the visibility of the plurality of grooves G is reduced so that the appearance quality is improved. Further, the stress concentrated on the folding area FA during the folding is effectively dispersed so that the folding characteristic may be improved.

The plurality of grooves G may be formed by removing a part of a material which forms the base layer 111. For example, the plurality of grooves G may be formed by a known method such as photolithography, laser etching, or plasma etching, but is not limited thereto.

The filler 112 is filled in at least a part of the plurality of grooves. For example, the filler 112 is filled in each of the plurality of grooves.

When the plurality of grooves G is formed on the base layer 111 which overlaps the folding area FA, the stress is dispersed during the folding so that the folding characteristic is improved. However, a step is formed and a flatness of the back plate 110 and the flexible display device 100 is deteriorated. Accordingly, problems such as separation or crack of the components are caused due to the stress irregularity during the folding so that the folding reliability is not satisfied or it is restricted to implement a flexible display device having a larger curvature. Further, when the flatness of the folding area FA is degraded, the distortion of the image which is displayed in the folding area FA is caused to deteriorate the display quality.

Therefore, the filler 112 is formed to be filled in the plurality of grooves G. The filler 112 includes a metal fiber. Therefore, the stress which is more concentrated on the folding area FA, specifically, in the groove G, during the folding may be more effectively dispersed. Accordingly, the folding characteristic is improved so that it is possible to easily implement the flexible display device 100 having a larger curvature.

When the filler 112 is not filled in the plurality of grooves G, the stress is concentrated on the engraved pattern portion which is recessed from the surface so that the rupture may be caused during the repeated folding. Accordingly, the folding reliability is not satisfied and the improvement of the curvature of the flexible display device may be limited.

In the related art, for the purpose of improvement of the folding characteristic without allowing the opening pattern to be visible, a soft material such as a silicon resin (for example, PDMS) or an acrylic resin is filled in the opening of the opening pattern. However, in this case, there is a problem in that the plastic deformation is easily caused due to the repeated folding.

The filler 112 of the present disclosure includes a metal fiber. For example, the metal fiber may include one or more metals selected from stainless steel, titanium, and aluminum. Such metal materials do not easily undergo plastic deformation and have excellent rigidity.

For example, the plurality of grooves G may be filled with a metallic yarn or a metal fiber sheet. That is, the filler 112 may be formed of the metallic yarn or the metal fiber sheet.

For example, the metallic yarn is processed to have a predetermined thickness and length by performing a stretching process on the metal fiber. For example, the metallic yarn may be formed by stretching a single metal fiber. As another example, the metallic yarn may have a twisted structure by twisting a single metal fiber in a predetermined direction or have a twisted structure by twisting a plurality of single metal fibers.

The metallic yarn is filled in each of the plurality of grooves G to form a structure in which the metal fiber is randomly entangled. As the metal fiber is randomly entangled, an irregular network structure is formed. Therefore, the filler 112 filled in each of the plurality of grooves G is formed to have a porous structure including a plurality of pores. The filler 112 has an elasticity by the structural characteristic described above. Accordingly, the metallic yarn is stretched along the folding direction (a Y-axis direction) during the folding and the stress is uniformly dispersed without being concentrated. Due to the structural characteristic, the restoring force is excellent and the deformation is not easily caused even during the repeated folding so that the durability is excellent.

For example, a diameter of the metallic yarn may be 5 μm to 15 μm. Within this range, the metallic yarn may be easily filled in each of the plurality of grooves G and the elasticity is excellent to effectively disperse the stress concentrated on the folding area FA during the folding.

As another example, the metallic yarn may be a yarn in which a polymer coating layer is formed on a surface of metallic yarn or a mixed yarn in which a metallic yarn and a polymer fiber are mixed. The polymer coating layer and the polymer fiber may be formed by a polymer such as polyester or nylon, but are not limited thereto.

The metal fiber sheet may be formed by a metal fiber which is randomly or regularly entangled and stacked to be formed as a film. For example, the metal fiber sheet may be a nonwoven sheet or a woven sheet formed of metal fibers.

The nonwoven sheet configures one sheet by metal sheets which are randomly entangled, but the woven sheet may be formed by metal sheets which are regularly entangled. Specifically, the woven sheet may be formed by intersecting and weaving metal fibers divided into vertical (warp) and horizontal (weft) threads, and has a structure in which metal fibers are arranged in a lattice form.

The nonwoven sheet and the woven sheet as described above are formed by randomly or regularly entangling the metal fibers to have a porous structure including a plurality of pores. Therefore, the filler 112 formed by filling the plurality of grooves G with the nonwoven sheet or the woven sheet has an elasticity. Accordingly, the nonwoven sheet and the woven sheet are stretched along the folding direction (a Y-axis direction) during the folding so that the stress may be uniformly dispersed without being concentrated. Due to the structural characteristic, the restoring force is excellent and the deformation is not easily caused even during the repeated folding so that the durability is excellent.

The nonwoven sheet or the woven sheet may further include a polymer coating layer or a polymer fiber. The polymer coating layer may be formed to coat the metal fibers which configure the sheet. Further, the polymer fiber is entangled with the metal fiber to form a woven structure. As another example, the nonwoven sheet or the woven sheet may be a sheet formed by immersing the nonwoven sheet or the woven sheet in a polymer to fill in the plurality of pores. Here, the polymer may be selected from polyester, nylon, or the like, but is not limited thereto.

When the plurality of grooves G is filled with the metallic yarn or the metal fiber sheet as described above, the mechanical strength of the back plate 110 may be maintained to be high by the high rigidity of the metal material. Further, as described above, the metallic yarn formed of the metal fiber or the metal fiber sheet has an excellent elasticity due to the structural characteristic. Therefore, in the filler 112 which is formed by filling the metallic yarn or the metal fiber sheet, the metal fiber in the filler 112 extends during the folding along the folding direction. As a result, during the folding, the stress may be uniformly dispersed without being concentrated on the folding area FA. Further, the filler 112 formed of the metal fiber due to the elastic characteristic may minimize the rupture of the back plate 110 or the plastic deformation due to the repeated folding.

In the meantime, the filler 112 may be attached into the plurality of grooves G by means of the adhesive layer 113. The conductive adhesive layer 113 may bond the filler 112 into the plurality of grooves G to fix them. The conductive adhesive layer 113 may be disposed on the innermost surface of the plurality of grooves G. Therefore, an upper surface of the filler 112 is bonded into the groove G by the conductive adhesive layer 113 so that the filler 112 may be fixed to the groove G without being deviated, during the folding. Further, the side surface of the filler 112 is not fixed by the conductive adhesive layer 113 so that the metal fiber in the filler 112 may be easily stretched along the folding direction during the folding. By doing this, the stress concentrated on the engraved pattern portion during the folding may be more effectively dispersed.

For example, the conductive adhesive layer 113 may be formed from a solder paste in which conductive particles are uniformly dispersed in a binder resin.

For example, the binder resin may be selected from an epoxy-based resin, a urethane-based resin, an acrylic resin, a silicon-based resin, a phenol-based resin, a melamine-based resin, an alkyd-based resin, a urea resin, an unsaturated polyester resin, and the like.

For example, the conductive particles may be selected from an alloy of tin and one or more metals selected from silver, copper, lead, bismuth, zinc, and indium.

When the heat is applied to the conductive particles, the conductive particles are melted and fused to allow the filler 112 to be bonded to the plurality of grooves G.

Hereinafter, a method for forming the filler 112 in the plurality of grooves G will be described in more detail with reference to FIGS. 4A to 4F. FIGS. 4A to 4F are schematic cross-sectional process views for explaining a manufacturing method of a back plate in a flexible display device according to an exemplary embodiment of the present disclosure.

Figure 4A:
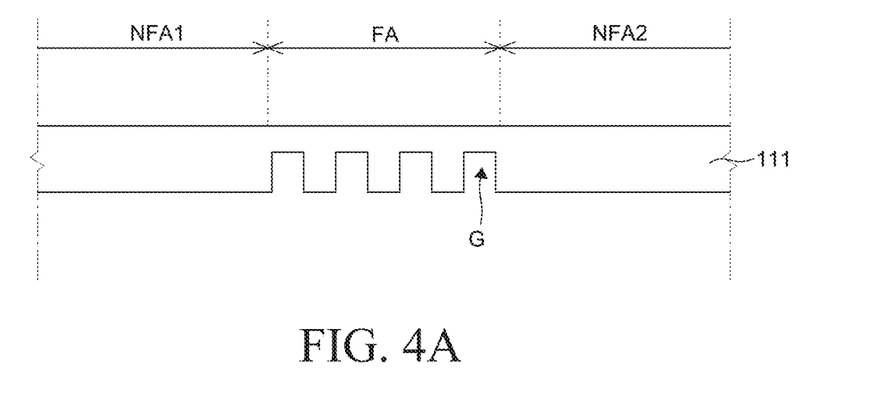
FIGS. 4A to 4F are schematic cross-sectional process views for explaining a manufacturing method of a back plate in a flexible display device according to an exemplary embodiment of the present disclosure.

First, a base layer 111 on which a plurality of grooves G is formed is prepared.

Referring to FIG. 4A, the plurality of grooves G is formed on a bottom surface of the base layer 111 corresponding to the folding area FA. As described above, the plurality of grooves G may be formed by a method selected from photolithographic, laser etching, and plasma etching processes.

Figure 4B:
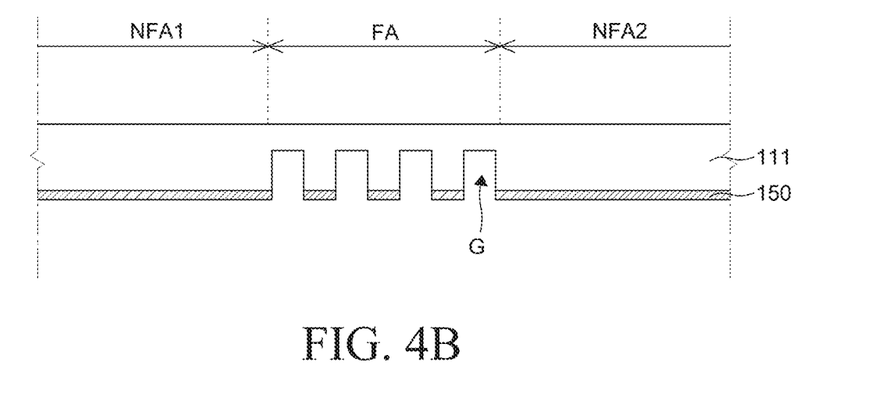

Next, a releasable adhesive layer 150 is formed on a bottom surface of the base layer 111.

Referring to FIG. 4B, the releasable adhesive layer 150 is selectively formed on the bottom surface of the base layer 111. The releasable adhesive layer 150 is formed on the bottom surface of the base layer 111 excluding the plurality of grooves G. That is, the releasable adhesive layer 150 is not formed in the plurality of grooves G. The releasable adhesive layer 150 may be formed using an adhesive which may be removed from the base material by lowering the adhesiveness as needed. For example, the releasable adhesive layer 150 may be formed by coating a reworkable optical clear adhesive or a water peel solution which is dissolved by the moisture to be released. For example, the reworkable optical clear adhesive may be an optical clear adhesive whose adhesiveness varies by heat, light, or a pressure, but is not limited thereto.

Figure 4C:
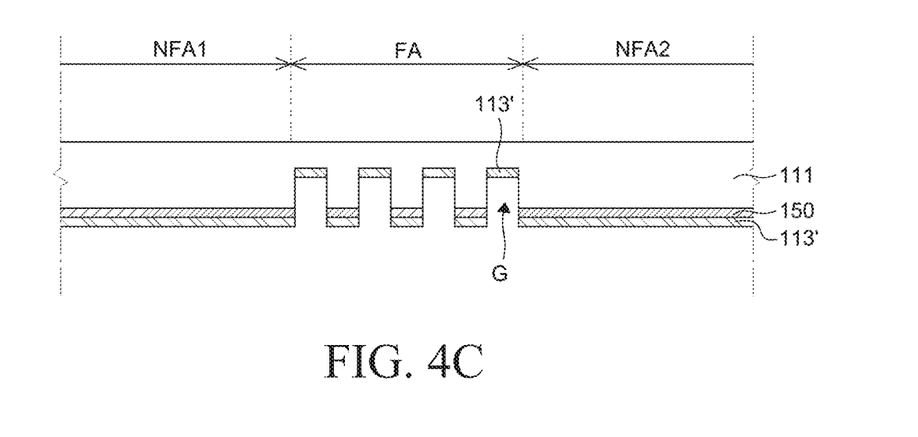

Next, a solder paste 113' is applied on the bottom surface of the base layer 111.

Referring to FIG. 4C, the solder paste 113' is applied on the entire bottom surface of the base layer 111. Unlike the releasable adhesive layer 150, the solder paste 113' is also applied to the inside of the plurality of grooves G. After applying the solder paste 113', an annealing process may be further included selectively as needed.

Figure 4D:
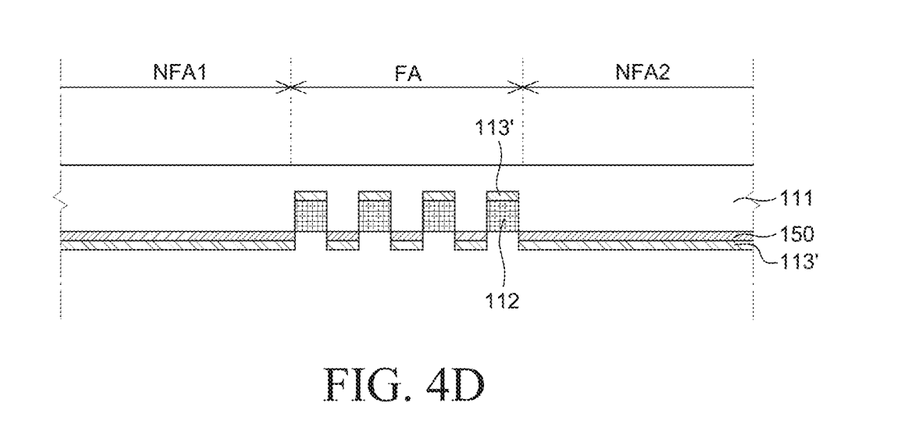

Next, the metal fiber is filled in the plurality of grooves G and is soldered to form the filler 112.

Referring to FIG. 4D, first, the metal fiber is filled in the plurality of grooves G. For example, a metal fiber sheet is laminated on the bottom surface of the base layer 111 corresponding to the folding area FA to fill the metal fiber in the plurality of grooves G. Specifically, the lamination is performed by bonding the metal fiber sheet on the bottom surface of the base layer 111 and then pressurizing them using a laminating roller. When the metal fiber sheet bonded to the base layer 111 is pressurized using the laminating roller, the metal fiber is filled in the plurality of grooves to form the filler 112.

Figure 4E:
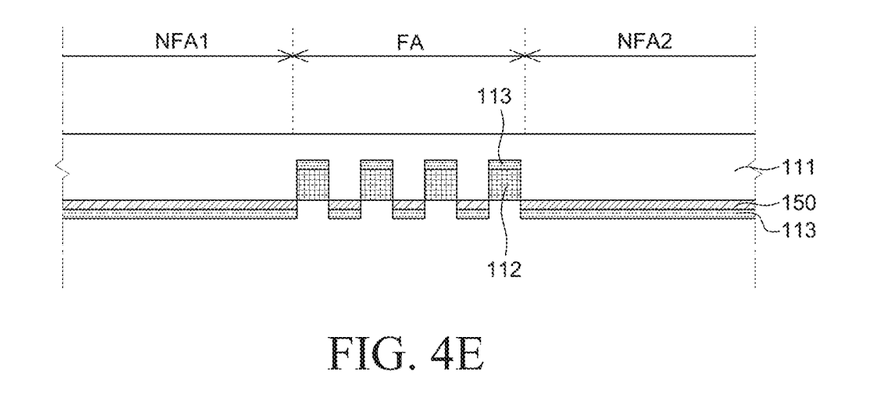

Next, the filler 112 is bonded into the plurality of grooves G using a soldering process.

Referring to FIG. 4E, after forming the filler 112, the soldering process is performed to fix the filler 112 to the plurality of grooves G without being deviated therefrom. The conductive particles in the solder paste 113' are melted and fused by the soldering process to form the conductive adhesive layer 113. Therefore, the top surface of the filler 112 which is in contact with the solder paste 113' is soldered in the plurality of grooves G to be fixed. For example, the soldering process is performed by heating for 30 seconds to 50 minutes at a temperature of 140° C. to 230° C. The heating unit is not specifically limited if the heating unit melts the conductive particles. The melted conductive particles are fused to form the conductive adhesive layer 113 and thus, the filler 112 may be firmly bonded into the plurality of grooves G by the conductive adhesive layer 113.

Figure 4F:
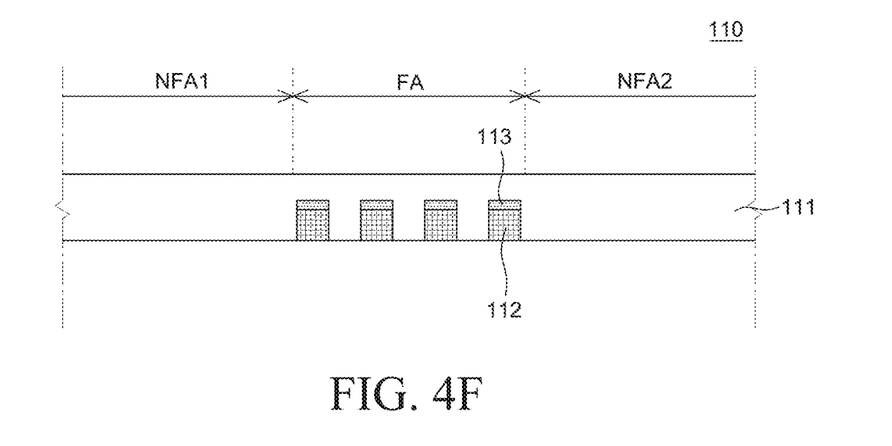

Next, the releasable adhesive layer 150 and the conductive adhesive layer 113 laminated on a surface thereof are removed.

As described above, the releasable adhesive layer 150 may be removed from the base material by lowering the adhesiveness as needed. Therefore, the releasable adhesive layer 150 and the conductive adhesive layer 113 laminated on a surface thereof may be collectively removed by lowering the adhesiveness of the releasable adhesive layer 150. For example, the releasable adhesive layer 150 which is formed by coating the water peel solution includes a material which is dissolved when the moisture is applied so that the adhesiveness may be lowered. As described above, the releasable adhesive layer 150 and the conductive adhesive layer 113 laminated on a surface thereof are removed by reducing the adhesiveness of the releasable adhesive layer 150 to manufacture a back plate 110 with a structure as illustrated in FIG. 4F.

The manufacturing process of the back plate 110 illustrated in FIGS. 4A to 4F are illustrative, so that it is not limited thereto. As another example, the back plate 110 may be manufactured by a micro spot soldering process. According to the micro spot soldering process, the solder paste is locally applied in a selected area to perform the soldering. For example, after preparing the base layer 111 in which the plurality of grooves G is formed, the solder paste is applied in each of the plurality of grooves G and then the metal fiber is filled therein to perform the soldering, thereby manufacturing the back plate 110. According to this method, the solder paste is not applied on the entire bottom surface of the base layer 111, but is locally applied in a necessary area, that is, in the plurality of grooves G. By doing this, the process of forming the releasable adhesive layer 150 illustrated in FIG. 4B and the process of removing the releasable adhesive layer 150 and the conductive adhesive layer 113 illustrated in FIG. 4F may be omitted.

The back plate 110 which supports the display panel 120 in the flexible display device 100 according to the exemplary embodiment of the present disclosure includes the base layer 111 including the plurality of grooves G on the bottom surface so as to correspond to the folding area FA and the filler 112 which is filled in the plurality of grooves G. The filler 112 includes a metal fiber. According to the present disclosure, the plurality of grooves G is formed in the base layer 111, rather than an opening pattern which passes through the base layer 111 so that the visibility of the pattern is reduced and the appearance quality is excellent. Further, the base layer 111 is formed of a material having an excellent rigidity so that the mechanical strength is excellent and the plurality of grooves G is formed so that the stress concentrated on the folding area FA during the folding may be uniformly dispersed. In addition, the filler 112 including the metal fiber is filled in the plurality of grooves G and the metal fiber has an excellent elasticity and restoration properties to be stretched along the folding direction during the folding and restored to its original state during the unfolding. Therefore, it is possible to provide a flexible display device 100 having excellent folding characteristic and reliability. Further, even though the flexible display device is repeatedly folded, due to a high elasticity of the metal fiber, rupture or plastic deformation is not easily generated so that excellent durability may be achieved.

In the flexible display device of the related art, a plate assembly including a plate top and a plate bottom is additionally disposed below the back plate and a damping layer is further provided in the plate assembly as needed to supplement the impact resistance so that the thickness of the flexible display device is significant. Therefore, it is difficult to implement the flexible display device with a larger curvature. Further, the damping layer is formed of a soft and flexible material such as PDMS, so that in the flexible display device of the related art having a damping layer, defects are easily generated due to dent or puncture during the folding.

However, in the back plate 110 according to the present disclosure, the folding characteristic is significantly improved while maintaining a mechanical rigidity to be high so that the plate assembly or the damping layer is not necessary. Therefore, the thickness of the flexible display device 100 is significantly reduced so that even though the curvature is implemented to be larger than that of the related art, the folding reliability may be satisfied.

For example, the flexible display device 100 according to the present disclosure may be implemented as a flexible display device having the folding area FA with a large curvature of 3 R or less, and further 1.5 R or less. Further, even though the curvature is increased, the folding reliability is satisfied so that it is possible to be implemented as a multi-foldable display device. In the present specification, the radius of curvature 1 R means that a radius of a curved surface of the folding area during the folding is 1 mm.

Figure 5:
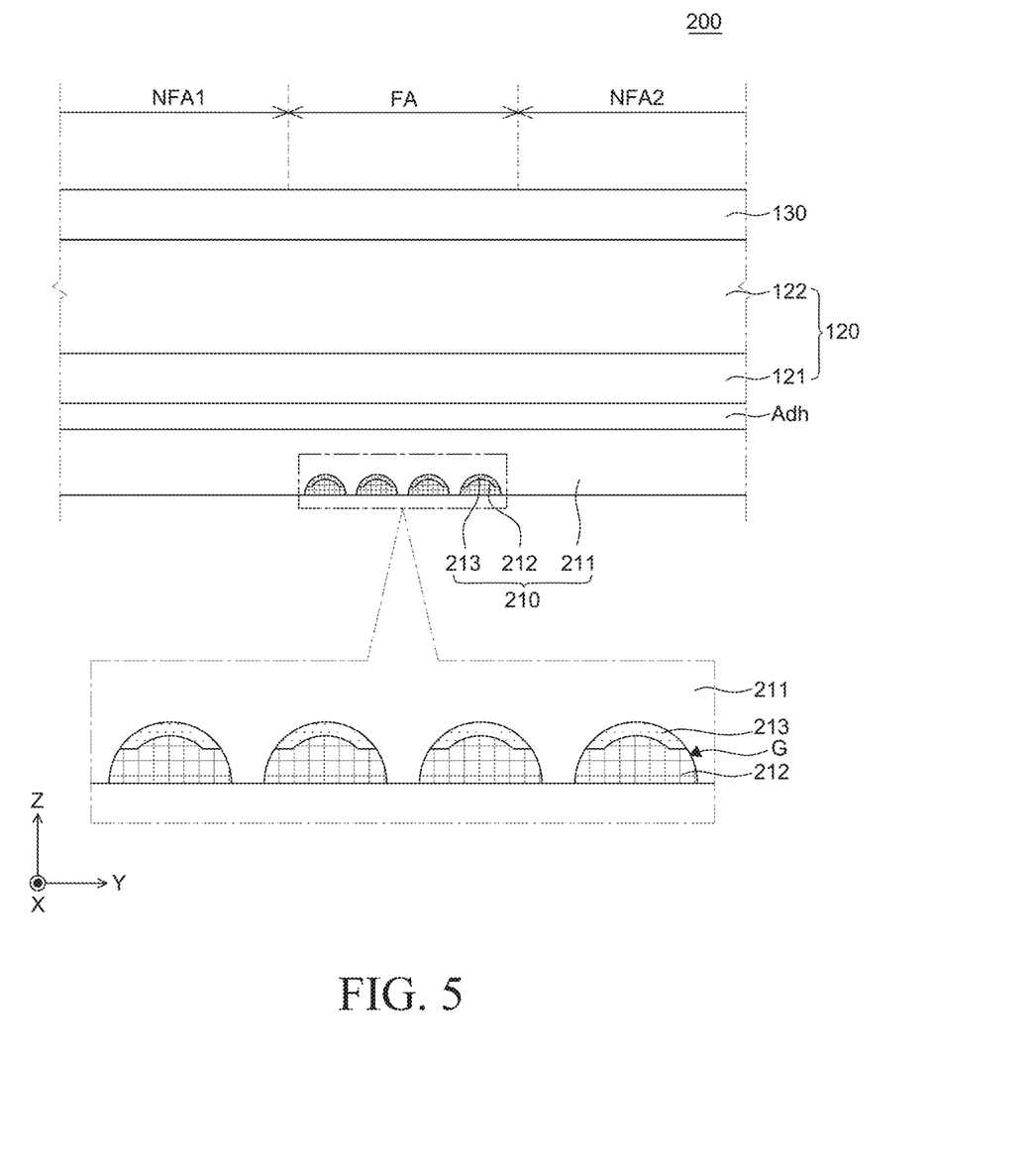
FIG. 5 is a schematic cross-sectional view of a flexible display device according to another exemplary embodiment of the present disclosure.

FIG. 5 is a schematic cross-sectional view of a flexible display device according to another exemplary embodiment of the present disclosure. Referring to FIG. 5, a flexible display device 200 according to another exemplary embodiment of the present disclosure includes a back plate 210, a display panel 120, and a cover member 130 and the back plate 210 includes a base layer 211, a filler 212, and a conductive adhesive layer 213. As compared with the flexible display device 100 illustrated in FIG. 2, the other components of the flexible display device 200 illustrated in FIG. 5 are substantially the same except for shapes of a plurality of grooves G, a filler 212, and a conductive adhesive layer 213, so that a redundant description will be omitted.

Referring to FIG. 5, the plurality of grooves G is formed on a bottom surface of the base layer 211 corresponding to the folding area FA. Each of the plurality of grooves G is recessed toward the top surface from the bottom surface of the base layer 211. At this time, each of the plurality of grooves G may be formed to have a semicircular cross-sectional shape. That is, each of the plurality of grooves G is formed such that a gradient is gradually reduced from the bottom surface of the base layer 111 to the top surface.

When the plurality of grooves G is formed to have a semicircular shape, the visibility of the pattern may be more reduced as compared with the flexible display device illustrated in FIG. 2. Therefore, it is possible to provide a flexible display device 200 having more excellent appearance quality.

Further, when the plurality of grooves G is formed to have a semicircular shape, a cross-sectional area of the groove G is gradually increased toward the bottom surface of the base layer 211. By doing this, a stress concentrated on the folding area FA when the flexible display device 200 is folded may be more effectively dispersed. Therefore, the flexible display device having a higher curvature while satisfying the folding reliability may be easily implemented.

As the plurality of grooves G is formed to have a semicircular shape, the filler 212 is also filled to have a semicircular shape corresponding to the plurality of grooves G.

Further, the conductive adhesive layer 213 which bonds the filler 212 to the groove G may also be formed to have a shape having a curvature.

As described above, as the plurality of grooves G, the filler 212, and the conductive adhesive layer 213 are formed to have curvatures, respectively, the visibility of the pattern is further reduced so that the appearance quality of the flexible display device 200 may be improved. Further, a folding stress when the flexible display device is folded is more advantageously dispersed so that the folding characteristic of the flexible display device 200 may be further improved. Specifically, even though the stress is more concentrated on a portion where the plurality of grooves G is formed during the folding, the back plate 110 with a structure illustrated in FIG. 5 may more effectively disperse the stress concentrated on the portions of the grooves G.

Accordingly, according to the exemplary embodiment illustrated in FIG. 5, a flexible display device having a larger curvature than that of the flexible display device 100 illustrated in FIG. 2 may be more easily implemented.

Figure 6:
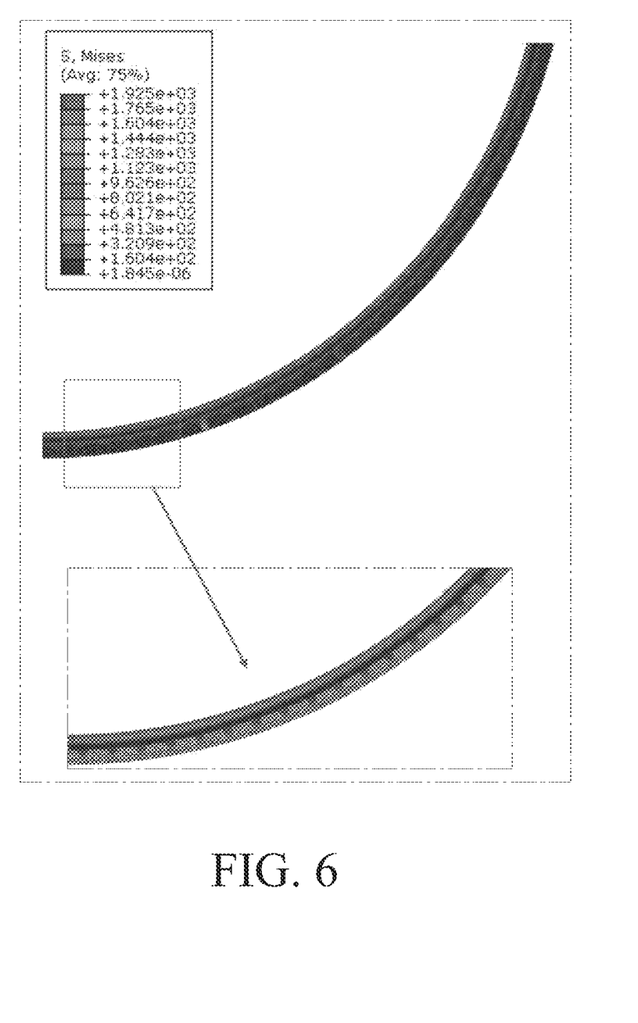
FIG. 6 is a view illustrating a folding simulation result of a back plate according to the present disclosure.
Figure 7:
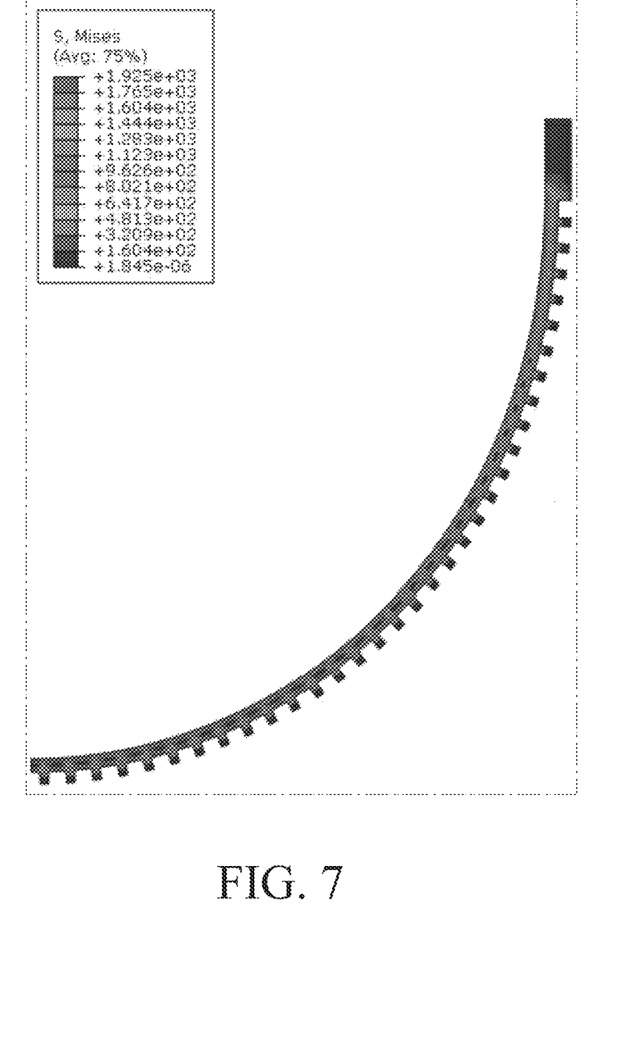
FIG. 7 is a view illustrating a folding simulation result of a back plate according to the related art.
Figure 8:
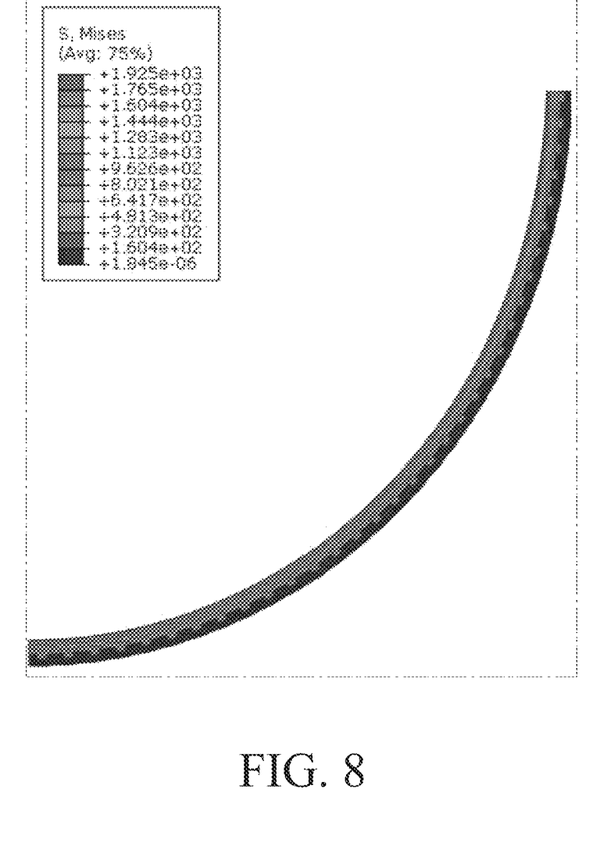
FIG. 8 is a view illustrating a folding simulation result of another back plate according to the related art.

FIGS. 6 to 8 are simulation views illustrating a stress distribution when a half module of the back plate of the present disclosure or the related art is in-folded with a radius of curvature of 3 R. The simulation result is represented with different colors in accordance with a degree of the stress which is applied to the back plate and as the stress is increased, blue, sky blue, green, yellow, and red are represented in this order.

First, FIG. 6 is a view illustrating a folding simulation result of a back plate according to the present disclosure. Specifically, FIG. 6 illustrates a simulation result of a back plate with a structure in which a plurality of grooves is formed to correspond to a folding area of a base layer formed of a stainless steel material and a metal fiber sheet is filled in the plurality of grooves.

Referring to FIG. 6, the back plate according to the present disclosure uniformly shows blue overall in the folding area and thus a stress applied to the back plate is low and is uniformly dispersed during the folding so that it is understood that the stress difference applied to every position is small.

FIG. 7 is a folding simulation result for a back plate according to the related art in which the plurality of grooves is formed in the folding area of the back plate, similarly to the present disclosure, but the filler is not filled in the plurality of grooves. Referring to FIG. 7, when the filler is not formed in the plurality of grooves, it is understood that the protrusion between the plurality of grooves is represented by blue but the folding area is entirely represented by green and red. This means that the stress applied to the folding area is large and the difference of the stress which is applied in accordance with the position is significant. Further, it is understood that the plurality of grooves is formed so that the stress is specifically concentrated on an engraved pattern portion with a relatively small thickness.

FIG. 8 illustrates a folding simulation result of a back plate in which a silicone gel is filled in the plurality of grooves as a filler, rather than the metal fiber sheet. Referring to FIG. 8, the entire folding area is represented by green and blue but in a folding area having a larger radius of curvature, an area represented with yellow and red is confirmed. Accordingly, when the plurality of grooves is filled with a silicone gel, it is confirmed that as compared with the back plate of FIG. 7 in which the plurality of grooves is not filled with the filler, the stress is slight relieved and uniform. However, as compared with the present disclosure in which the plurality of grooves is filled with the metal fiber, it is confirmed that the relieving and dispersion of the stress are insignificant.

In summary, in the flexible display device according to the present disclosure, the back plate includes a base layer including a plurality of grooves on a bottom surface so as to correspond to the folding area, and a filler which is filled in at least a part of the plurality of grooves and includes a metal fiber. By doing this, the stress concentrated on the folding area during the folding is reduced and the stress is uniformly dispersed in the folding area so that the excellent folding characteristic and reliability are provided.

The exemplary embodiments of the present disclosure can also be described as follows:

According to an aspect of the present disclosure, a flexible display device includes a display panel including a folding area and a non-folding area and a back plate which includes a base layer which supports the display panel, below the display panel and includes a plurality of grooves on a bottom surface corresponding to the folding area and a filler which is filled in at least a part of the plurality of grooves, wherein the filler includes a metal fiber.

A thickness of the base layer may be 90 μm to 220 μm.

The base layer may be formed of one or more metals selected from stainless steel (SUS), invar, aluminum and magnesium.

The plurality of grooves may be recessed toward a top surface from the bottom surface of the base layer.

Each of the plurality of grooves may extend to be parallel to a folding axis.

A depth of each of the plurality of grooves may be 10 μm to 40 μm.

The plurality of grooves may be formed to have a quadrangular or semicircular shape.

The metal fiber may be a metallic yarn or a metal fiber sheet and the filler may be formed by filling the plurality of grooves with the metallic yarn or the metal fiber sheet.

The metal fiber may include one or more metals selected from stainless steel, titanium, and aluminum.

A diameter of the metallic yarn may be 5 μm to 15 μm.

The metal fiber sheet may include a structure in which the metal fiber is disposed in a lattice pattern.

The metal fiber sheet may be an unwoven sheet or a woven sheet including the metal fiber.

The filler may be attached to each of the plurality of grooves by means of a conductive adhesive layer.

A top surface of the filler may be soldered to each of the plurality of grooves by the conductive adhesive layer.

A radius of curvature of the folding area may be 3 R or less.

It will be apparent to those skilled in the art that various modifications and variations can be made in the flexible display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A flexible display device, comprising:
    a display panel including a folding area and a non-folding area; and
    a back plate which includes a base layer which supports the display panel, below the display panel and includes a plurality of grooves on a bottom surface corresponding to the folding area and a filler which is filled in at least a part of the plurality of grooves,
    wherein:
    the filler includes a metal fiber;
    the base layer is formed of metals;
    the filler is attached to each of the plurality of grooves by means of a conductive adhesive layer;
    a top surface of the filler is soldered to each of the plurality of grooves by the conductive adhesive layer;
    a side surface of the filler is not fixed by the conductive adhesive layer so that the metal fiber of the filler is stretched along a folding direction during a folding; and
    the conductive adhesive layer is disposed on a lower part of the base layer, and the filler is disposed on a lower part of the conductive adhesive layer in the folding area.

2. The flexible display device according to claim 1, wherein a thickness of the base layer is 90 μm to 220 μm.

3. The flexible display device according to claim 1, wherein the base layer is formed of one or more metals selected from stainless steel (SUS), invar, aluminum and magnesium.

4. The flexible display device according to claim 1, wherein the plurality of grooves is recessed toward a top surface from the bottom surface of the base layer.

5. The flexible display device according to claim 1, wherein each of the plurality of grooves extends to be parallel to a folding axis.

6. The flexible display device according to claim 1, wherein a depth of each of the plurality of grooves is 10 μm to 40 μm.

7. The flexible display device according to claim 1, wherein the plurality of grooves is formed to have a quadrangular or semicircular shape.

8. The flexible display device according to claim 1, wherein the metal fiber is a metallic yarn or a metal fiber sheet and the filler is formed by filling the plurality of grooves with the metallic yarn or the metal fiber sheet.

9. The flexible display device according to claim 8, wherein the metal fiber includes one or more metals selected from stainless steel, titanium, and aluminum.

10. The flexible display device according to claim 8, wherein a diameter of the metallic yarn is 5 μm to 15 μm.

11. The flexible display device according to claim 8, wherein the metal fiber sheet includes a structure in which the metal fiber is disposed in a lattice pattern.

12. The flexible display device according to claim 8, wherein the metal fiber sheet is an unwoven sheet or a woven sheet including the metal fiber.

13. The flexible display device according to claim 1, wherein a radius of curvature of the folding area is 3 R or less.

* * * * *